United States Patent [19]
Burton

[11] 3,728,735
[45] Apr. 17, 1973

[54] WRITING APPARATUS FOR USE WITH GALVANOMETER DEVICES

[75] Inventor: James A. Burton, Houston, Tex.
[73] Assignee: AMF Incorporated
[22] Filed: May 3, 1971
[21] Appl. No.: 139,405

[52] U.S. Cl. ............................346/139 C, 324/151 R
[51] Int. Cl. ..............................................G01d 15/24
[58] Field of Search ....................346/139 C, 139 R; 324/151 R

[56] References Cited

UNITED STATES PATENTS

| | | |
|---|---|---|
| 2,955,895 | 10/1960 | Buoymaster et al. ..........346/139 C X |
| 3,346,871 | 10/1967 | Fowler................................346/139 C |
| 3,434,159 | 3/1969 | Erdman ...........................346/139 C |

*Primary Examiner*—Joseph W. Hartary
*Attorney*—George W. Price and John H. Gallagher

[57] ABSTRACT

A stylus for use with a recording galvanometer instrument wherein desired stylus pressure on a writing surface is obtained by providing magnetic material in association with the stylus. The fringing magnetic flux field of the galvanometer attracts the magnetic material and the attractive force is transferred to the stylus to provide the desired stylus pressure.

9 Claims, 3 Drawing Figures

PATENTED APR 17 1973                                    3,728,735

INK SUPPLY

INVENTOR.
JAMES A. BURTON

BY

John H. Gallagher
ATTORNEY

WRITING APPARATUS FOR USE WITH GALVANOMETER DEVICES

BACKGROUND OF THE INVENTION

In the art of electrical measurements, an instrument called a strip chart recorder is widely used to provide a permanent visual record of a measured quantity or characteristic. As is well known, this type of recorder includes a D'Arsonval instrument, or galvanometer, which is comprised of a generally rectangularly shaped electrical coil disposed between the poles of a permanent magnet. The coil is free to rotate in the magnetic field of the permanent magnet and a stylus for making a trace on a moving writing surface such as a strip of paper is secured to and movable with the coil. Current whose characteristic is to be recorded is coupled to the coil and causes the coil to rotate or pivot as a function of the current passing therethrough. In many strip chart recorders the stylus is a thin tube which is connected to a reservoir of ink, thus functioning as a pen to produce an ink trace on a sheet of paper which moves relative to the pen. To obtain a good legible trace on the paper the stylus must contact the paper with a pressure which is supplied by any of various types of spring arrangements associated with the stylus and the apparatus for attaching the stylus to the deflection coil of the D'Arsonval instrument. Usually, the pen, the apparatus for mounting the pen on the coil, and the spring arrangement are rather delicate and small in size, thus requiring careful use and handling to assure proper functioning of the recorder. Proper and uniform pressure of the stylus on the writing surface is required to achieve uniform and accurate response from the D'Arsonval instrument and to assure that the stylus will produce a legible and uniform trace on the writing surface. If the pen pressure is too great, the pen will be restrained in its movement so that it cannot properly respond to the high frequency signals from the D'Arsonval instrument, and if the pen pressure is too light the pen will overrespond to short duration high frequency signals thereby producing distorted spikes on the paper and flinging ink over the surface of the paper.

In the use of strip chart pen recorders the flow of ink through the stylus often is impeded either because the ink dries in the stylus or because foreign substance blocks the flow of ink. When this occurs the operator of the equipment must remove the stylus and correct the trouble. Because of the delicate nature of the instrument, the stylus, the spring arrangement, and the mechanism for connecting the stylus to the deflection coil all are subject to bending, distortion, misalignment, or other types of damage which may affect the functioning of the galvanometer and/or the pressure of the stylus on the writing surface. When the instruments are used "in the field" where they are likely to be subjected to a vigorous physical environment including shock, viration, dust, etc., the above-mentioned difficulties are experienced to a considerable extent. The more frequently the equipment operator must handle and make adjustments to the delicate apparatus the more likely it is that further malfunction or damage may occur. Additonally, considerable time is lost when the operator becomes involved in making the adjustments and repairs discussed above.

BRIEF SUMMARY OF THE INVENTION

The invention is a simple and reliable arrangement for achieving desired and unchanging pressure of a writing stylus of a recording galvanometer on the writing surface. The stylus is mounted on the galvanometer substantially free of any restraint on its movement about a horizontal axis, and without any mechanical arrangement for applying a force to provide pressure of the writing end of the stylus on the writing surface.

Because the galvanometer includes a permanent magnet which has rather large magnetic poles, a fringing magnetic flux field extends outwardly from the poles to the exterior portion of the instrument. This fringing field is fixed in position and, for practical purposes, may be considered to be unchanging in magnitude.

Magnetic material is provided as part of, or as an adjunct to the stylus structure and is located so as to be in the fringing field of the permanent magnet of the D'Arsonval instrument. The fringing magnetic field exerts a constant attractive force on the magnetic material in the stylus and maintains a constant pressure of the stylus on the writing surface. No springs or other types of mechanical arrangements are required so that when replacement or repair of the stylus is required there is little likelihood that any change in stylus pressure will occur. Additionally, a simple arrangement may be used for attaching the stylus to the galvanometer instrument.

DESCRIPTION OF THE PREFERRED EMBODIMENT

Figure 1:
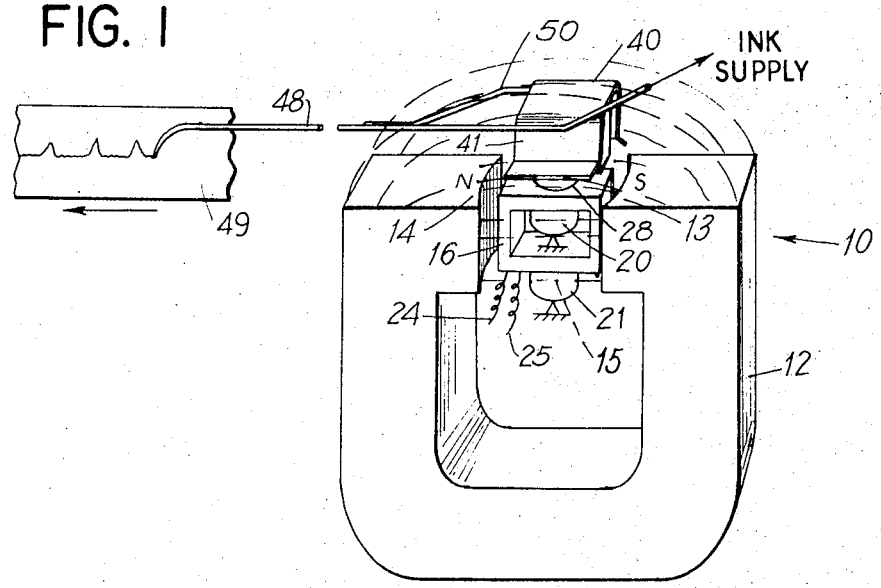
FIG. 1 is a simplified illustration of the novel pen stylus of this invention shown in operative association with a galvanometer instrument.
Figure 2:
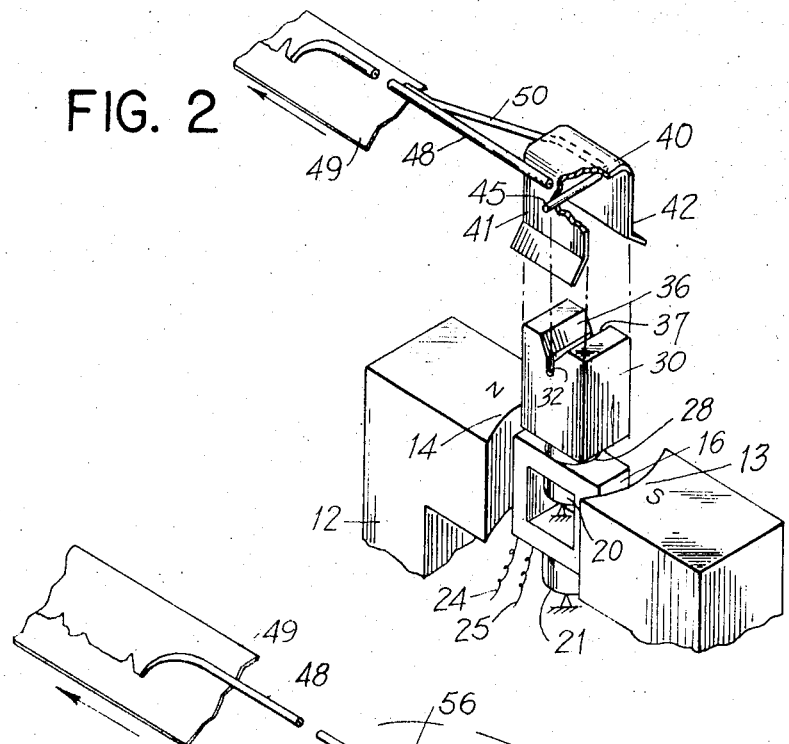
FIG. 2 is an exploded view of a portion of FIG. 1.

Referring to FIGS. 1 and 2, the D'Arsonval instrument, or galvanometer, 10 is shown in simplified form since these types of instruments are well known in the art and the basic instrument itself is not the subject of this invention. The instrument is comprised of a horseshoe permanent magnet 12 having the pole pieces 13 and 14. The faces of pole pieces 13 and 14 are curved to provide a radially directed magnetic flux field 15 that extends between the faces of the pole pieces. Magnetic flux field 15 is substantially uniformly distributed in the region between the pole pieces 13 and 14 and, for practical purposes, is constant in magnitude.

An electrical coil 16 having a plurality of turns is disposed in the magnetic field between pole pieces 13 and 14. Coil 16 is the current responsive element of the instrument and is rotatably supported relative to the frame of the instrument (not illustrated) by suitable means 20 and 21 which may be any of several known means such as jewelled bearings and an appropriate spring restraint. Electrical leads 24 and 25 connect coil 16 to a transducer or other type of circuitry which provides the electrical signal whose characteristic is to be monitored. Coil 16 will rotate in its bearings about a vertical axis through an angle that is a function of the current passing therethrough.

Secured to the top of coil 16 and movable therewith is a supporting socket 28 which receives therein a stylus support member 30 that is best seen in FIG. 2. Stylus support member 30 is generally block shaped and has a stud at its lower end which fits within socket 28 and is secured therein as by a set screw (not illustrated) so that support member 30 rotates with coil 16 and socket 28. The upper portion of stylus support member 30 is notch shaped and includes an open bore 32 which is accessible from the top surface by means of the inclined surfaces 36 and 37 of the notch.

Seated on top of support member 30 is a cap-like stylus retaining member 40 having the side skirts 41 and 42 which fit over the sides of support member 30 in a manner so as not to act as clips or clamps, but yet with a minimum of clearance so that the cap 40 will not substantially wobble or move about a vertical axis relative to the support member 30. A rocker pin 45 extends between side skirts 41 and 42 of cap 40 and is secured thereto. Rocker pin 45 is of smaller diameter than open bore 32 and is received therein. Cap 40 is free to pivot on rocker pin 45 relative to support member 30.

A tubular pen stylus 48 of conventional construction is secured to skirt 41 of cap 40 and is movable therewith. The right end of stylus 48 is connected by suitable means such as flexible tubing to an ink supply and the left end of stylus 48 contacts the writing surface 49 which may be a paper strip chart. Styluses such as illustrated at 48 are commercially available, or may be fashioned from small metal tubing commonly used for hypodermic needles, for example. The materials used in styluses are relatively noncorrosive metal such as stainless steel to minimize clogging of the small capillary tube of the stylus due to chemical action of the ink with the metal. The metals used for the styluses are nonmagnetic.

In accordance with this invention a rigid supporting strut 50 of a magnetic material is secured at its right end to skirt 42 of cap 40 and is secured at its left end to stylus 48. In addition to functioning as a mechanical stiffening member for stylus 48, strut 50 also functions to provide means for holding stylus 48 on writing surface 49 with the desired constant pressure. As seen in FIG. 1, the magnetic flux field between pole pieces 13 and 14 inherently fringes outwardly above and between the top surfaces of the pole pieces. Strut 50 is located in this fringing magnetic field, and being a magnetic material, is attracted downwardly by the attractive force of the fringing field. This attractive force exerted on strut 50 is transferred to stylus 48 since the strut is rigidly secured to stylus 48. Stylus 48, by virtue of its attachment to cap 40, freely pivots about rocker pin 45 and contacts writing surface 49 with a pressure which is a function of the strength of the fringing magnetic field and of the physical and magnetic properties of strut 50. The desired magnitude of stylus pressure is obtained by empirically selecting the proper size, location and magnetic material for strut 50.

Because strut 50 is fixed in position relative to stylus 48, and because the fringing magnetic field is unchanging in magnitude, the force applied to stylus 48 will be substantially constant. A particularly attractive feature of this invention is that the fringing magnetic field already exists in the galvanometer instrument so that no separate or additional magnetic source need be provided. Additionally, no springs or clips are used so that there are no mechanical force applying means which can get out of adjustment or become damaged. The very simple arrangement for attaching cap 40 to support member 30 permits simple and rapid removal of the stylus for repair or replacement. After replacement of cap 40 the stylus pressure inherently will be the same magnitude as before. It is to be noted that the attractive force of the fringing magnetic field on strut 50 also serves to hold rocker pin 45 in bore 32. Because rocker pin 45 should be free to pivot in bore 32, cap 40 rocker pin 45, and possibly support member 30 should be made of a nonmagnetic material to avoid magnetic attraction therebetween and resulting binding at the pivot formed by rocker pin 45 and bore 32.

Figure 3:
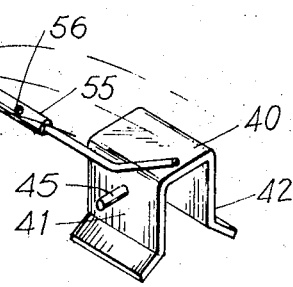
FIG. 3 is a simplified illustration of an alternative embodiment of a pen stylus constructed in accordance with the principle of this invention.

An alternative embodiment of the present invention is illustrated in simplified form in FIG. 3 wherein the magnetic strut 50 of FIGS. 1 and 2 is not utilized, but instead a thin sleeve 55 of magnetic material is placed on the stylus 48 and fixed in position by means of a set screw 56. Sleeve 55 is located in the fringing magnetic field of pole pieces 13 and 14 and its position on stylus 48 is chosen to obtain the magnetic attractive force that produces the desired stylus pressure on the writing surface 49. The construction of cap 40 and its attachment to stylus support member 30 will be the same as illustrated in FIGS. 1 and 2. For mechanical reasons it may be desired to have some support for stylus 48 of FIG. 3. This may be provided in any manner desired.

It is to be understood that the writing implement that is movable with coil 16 need not be the long hollow tube through which ink flows, as illustrated in FIGS. 1-3. The stylus arm may have at its end a ball point pen, or a graphite point, or some other type of writing implement may be employed. Irrespective of the form of the writing implement, a desired pressure of that implement on a writing surface may be obtained by providing a magnetic material in association with the implement, wherein the material is disposed in the fringing magnetic flux field of the galvanometer pole pieces.

In view of the above discussion, other embodiments operating in accordance with the principle of this invention will become apparent to those skilled in the art.

What is claimed is:

1. In a recording instrument having a movable response element disposed between magnetic pole pieces, wherein the pole pieces establish a magnetic flux field which intersects the element and also establish a fringing magnetic flux field that extends outwardly beyond the pole pieces, said instrument also having a writing implement mounted for movement with said element and located at least partially in or adjacent said fringing magnetic flux field, the improvement in means for applying a force to said writing implement to produce a desired implement pressure on a writing surface, said improvement comprising magnetic material associated with the implement and movable therewith and disposed in said fringing magnetic flux field, whereby the force produced by the fringing magnetic flux field acting on the magnetic material produces the desired implement pressure on the writing surface.

2. In a recording instrument having a movable response element disposed between magnetic pole pieces, wherein the pole pieces establish a magnetic flux field which intersects said element and a fringing magnetic flux field that extends outwardly beyond the pole pieces, said instrument also having a stylus mounted for movement with said element and located in or adjacent said fringing magnetic flux field, the improvement in means for applying a force to said stylus to obtain desired stylus pressure on a writing surface, said improvement comprising a member of magnetic material coupled to and movable with said stylus and located in said fringing magnetic flux field, whereby the force produced by the fringing magnetic flux field acting on the magnetic member is transferred to said stylus to apply the desired stylus pressure on said writing surface.

3. In a recording instrument having a movable response element disposed between magnetic pole pieces, wherein the pole pieces establish a magnetic flux field which intersects said element and establish a fringing magnetic flux field that extends outwardly beyond the pole pieces, said instrument also having a writing stylus mounted for movement with said element about a first axis and for pivotal movement about a second axis transverse to said first axis, the stylus being located in or adjacent said fringing magnetic flux field and having its writing end adapted to engage a writing surface, the improvement in means for applying a force to said stylus to obtain desired pressure of its writing end on a writing surface, said improvement comprising a member of magnetic material attached to said stylus and movable therewith, the member of magnetic material being located in said fringing magnetic flux field, whereby the fringing magnetic flux field attracts the magnetic member to apply to the stylus a force which acts about said second axis to produce desired stylus pressure on the writing surface.

4. The improvement claimed in claim 3 wherein the mounting of the stylus for pivotal movement about the second axis is accomplished by means comprised of a stylus support member secured to and movable with said movable response element, said support member having an end opposite said response element provided with a notch, a stylus retaining member having a pivot means disposed within said notch for pivotal movement therewith about said second axis, said stylus being secured to said stylus retaining member and extending therefrom.

5. The improvement claimed in claim 4 wherein said member of magnetic material comprises an elongated strut secured at one end to said stylus retaining member and secured at its opposite end to said stylus.

6. The improvement in claim 4 wherein said member of magnetic material is a sleeve positioned about said stylus.

7. A stylus for use in a recording instrument having a movable responsive element and magnetic pole pieces that produce a fringing magnetic flux field thereabout, said stylus comprising an elongated member adapted to be coupled at one end to the responsive element and when so coupled being disposed at least partially in said fringing magnetic flux field, a member of magnetic material attached to said elongated member at a region intermediate its two ends and movable with the elongated member, said magnetic member being positioned on the elongated member for location in said fringing magnetic flux field.

8. The stylus claimed in claim 7 wherein said member of magnetic material surrounds said elongated member.

9. The stylus claimed in claim 7 wherein said member of magnetic material is an elongated strut adapted for supporting said elongated member.

* * * * *